(12) United States Patent
Yeh et al.

(10) Patent No.: US 6,553,488 B2
(45) Date of Patent: *Apr. 22, 2003

(54) METHOD AND APPARATUS FOR BRANCH PREDICTION USING FIRST AND SECOND LEVEL BRANCH PREDICTION TABLES

(75) Inventors: Tse-Yu Yeh, Milpitas, CA (US); Harshvardhan P. Sharangpani, Santa Clara, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,885

(22) Filed: Sep. 8, 1998

(65) Prior Publication Data

US 2001/0047467 A1 Nov. 29, 2001

(51) Int. Cl.[7] .................................................. G06F 9/00
(52) U.S. Cl. ...................................... 712/239; 712/240
(58) Field of Search ................................ 712/237, 238, 712/239, 207, 240; 711/122, 117

(56) References Cited

U.S. PATENT DOCUMENTS

| | | | | | |
|---|---|---|---|---|---|
| 5,163,140 A | * | 11/1992 | Stiles | ........................ | 711/140 |
| 5,608,886 A | * | 3/1997 | Blomgren et al. | .......... | 712/239 |
| 5,732,253 A | * | 3/1998 | McMahan | .................... | 712/240 |
| 5,748,932 A | * | 5/1998 | Dyke et al. | ................. | 707/526 |
| 5,802,602 A | | 9/1998 | Rahman et al. | ............. | 711/204 |
| 5,805,878 A | * | 9/1998 | Rahman | ...................... | 712/239 |
| 5,815,700 A | * | 9/1998 | Poplingher | .................. | 712/240 |
| 5,903,750 A | * | 5/1999 | Yeh | .............................. | 712/236 |
| 5,933,628 A | * | 8/1999 | Chang | ......................... | 712/233 |
| 5,961,638 A | * | 10/1999 | Tran | ............................ | 712/239 |
| 5,978,909 A | * | 11/1999 | Lempel | ....................... | 712/240 |

OTHER PUBLICATIONS

Yeh, Tse–Yu et al., "Alternative Implementations of Two–Level Adaptive Branch Prediction", The University of Michigan, pp. 124–128, Jul. 1992.*

* cited by examiner

*Primary Examiner*—John F. Niebling
*Assistant Examiner*—Stacy Whitmore
(74) *Attorney, Agent, or Firm*—Blakely, Sokoloff, Taylor & Zafman LLP

(57) ABSTRACT

A branch predictor. A first branch prediction table is coupled to an instruction pointer generator to store tagged branch prediction entries and to provide branch predictions at high speed. A second branch prediction table is also coupled to the instruction pointer generator to store untagged branch prediction entries and to provide branch predictions for a much larger working set of branches, albeit at a slower speed.

25 Claims, 3 Drawing Sheets

METHOD AND APPARATUS FOR BRANCH PREDICTION USING FIRST AND SECOND LEVEL BRANCH PREDICTION TABLES

FIELD OF THE INVENTION

The present invention relates to computer systems and more particularly to a processor that performs branch prediction using first level and second level branch prediction tables.

BACKGROUND OF THE INVENTION

Advanced processors employ pipelining techniques to execute instructions at very high speeds. On such processors, the overall machine is organized as multiple pipelines consisting of several cascaded stages of hardware. Instruction processing is divided into a sequence of operations, and each operation is performed by hardware in a corresponding pipeline stage ("pipe stage"). Independent operations from several instructions may be processed simultaneously by different pipe stages, increasing the instruction throughput of the processor. Where a pipelined processor includes multiple execution resources in each pipe stage, the throughput of the processor can exceed one instruction per clock cycle. To make full use of this instruction execution capability, the execution resources of the processor must be provided with sufficient instructions from the correct execution path.

In a typical computer system, an instruction pointer (IP) directs the processor from one instruction of the program code to the next instruction. An instruction might direct this IP to the next instruction in the normal program code sequence, or it may direct the IP to skip a portion of the program code and resume execution with a non-sequential instruction. The instruction that causes the processor to either continue executing the next instruction in sequence or "branch" to a different, non-sequential instruction is called a branch instruction.

For example, when a word processor does spell-checking, software instructions are executed to verify that each word is spelled correctly. As long as the words are spelled correctly, the instructions execute sequentially. Once an incorrectly spelled word is found, however, a branch instruction directs the IP to branch to a subroutine that notifies the user about the incorrectly spelled word. This subroutine is then executed by the processor.

Branch instructions pose major challenges to keeping the pipeline filled with instructions from the correct execution path. When a branch instruction is executed and the branch condition met, control flow of the processor jumps to a new code sequence, and instructions from the new code sequence are transferred to the pipeline. Branch execution typically occurs at the back end of the pipeline, while instructions are fetched at the front end of the pipeline. If instruction fetching relies on branch execution to determine the correct execution path, the processor pipeline may be filled with instructions from the wrong execution path before the branch condition is resolved. These instructions would then have to be flushed from the pipeline, leaving resources in the affected pipe stages idle while instructions from the correct execution path are fetched. The idle pipe stages are referred to as pipeline bubbles, since they provide no useful output until they are filled by instructions from the correct execution path.

Modern processors incorporate branch prediction modules at the front ends of their pipelines to reduce the number of pipeline bubbles. When a branch instruction enters the front end of the pipeline, the branch prediction module predicts whether the branch instruction will be taken when it is executed at the back end of the pipeline. If the branch is predicted taken (non-sequential instruction execution), the branch prediction module provides a branch target address to the instruction fetch module, redirecting the IP by setting the IP address equal to the address containing the first instruction of the branched program code. The address containing this first instruction of the branched code is called the "target address." The fetch module, which is also located at the front end of the pipeline, begins fetching instructions from the target address. If, on the other hand, a branch predictor predicts that a branch will not be taken (sequential instruction execution), the branch predictor increments the IP address so that the IP points to the next instruction in the normal program code sequence. When branch execution occurs in the backend of the pipeline, the processor can validate whether the prediction made in the front end was correct. If incorrect, the pipeline is flushed. The higher the branch prediction accuracy, the fewer the number of pipeline bubbles and flushes.

Conventional branch prediction modules employ branch target buffers (BTBs) to store prediction entries containing information such as whether a branch will be taken and the likely target address when the branch is taken. These branch prediction entries are associated with the IP addresses that contain the branch instructions. For each IP address that is tracked in a branch prediction table, its associated branch prediction entry includes the IP address along with historical information that is helpful to predict whether or not the branch will be taken in the future. However, even the process of looking up an instruction in the BTB, determining whether the branch is taken, and providing a target address to the fetch module on a taken prediction causes a delay in resteering the processor to the target address. This delay allows instructions from the wrong execution path to enter and propagate down the pipeline. Since these instructions do not add to forward progress on the predicted execution path, they create "bubbles" in the pipeline when they are flushed. More accurate and complete branch prediction algorithms (using larger sized branch tables) take longer to complete and generate greater delays in the resteer process. The greater the number of clock cycles required to resteer the pipeline, the greater the number of bubbles created in the pipeline. Thus there is a tradeoff between the speed of access of the branch prediction structures, and the size and accuracy of the content in these structures.

For speed and cost reasons, modern processors often limit the size of the BTB employed. This reduces the accuracy of the branch detection and prediction, especially on large workloads. Given the smaller size of the BTB, a new branch prediction entry sometimes must overwrite an older branch prediction entry. If a branch instruction associated with an overwritten branch prediction entry is then re-executed by the processor, no historical information exists to help the branch predictor predict whether or not the branch should be taken. As a result, branch prediction accuracy decreases, reducing processor performance. As the size of software applications increases, the number of branch instructions in those applications increases, and the limited size of the branch prediction table becomes a significant problem. Thus there is a need to provide a solution that yields low latency branch predictions for the most frequent subset of branches (those with high locality), and yet provides meaningful predictions for the overall working set.

SUMMARY OF THE INVENTION

A branch predictor is described. A first branch prediction table is coupled to an IP generator to store branch prediction entries. A second branch prediction table is also coupled to the IP generator to store a greater number of branch prediction entries.

In accordance with an embodiment of the present invention, the two level branch prediction structure may be found to combine the benefits of high speed (low latency) branch prediction and resteering for the highest locality of branches, with overall high accuracy branch detection and prediction for the overall working set at large, albeit at reduced speed. This may be accomplished without significant die size growth.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A branch predictor for a processor having first level and second level branch prediction tables is described. An initial instruction pointer (IP) address is generated by an IP generator. The first level (L1) branch prediction table (BPT) and the second level (L2) BPT are searched for branch prediction entries associated with the initial IP address. For one embodiment of the present invention, the L1 BPT is associative (i.e. fully associative or multi-way set associative) and the L2 BPT is direct-mapped.

Because the L1 BPT is associative, branch prediction entries are tagged, and these tags, along with branch prediction information, are stored in the L1 BPT. Branch prediction entries in the direct-mapped L2 BPT are untagged, so only branch prediction information is stored in the L2 BPT. Because the branch prediction entries in the L1 BPT are larger than the branch prediction entries in the L2 BPT, the L2 BPT can have more branch prediction entries in the same amount of space as the L1 BPT. Therefore, although the L1 BPT may be more accurate and faster than the L2 BPT, the L2 BPT acts as a "back-up" to the L1 BPT, allowing additional branch prediction information to be stored for a relatively small increase in processor size. By including both the L1 BPT and the L2 BPT in a processor, branch prediction accuracy and overall speed may be simultaneously improved without a significant increase in hardware cost. Additional, modest increases in the size of the L2 BPT can further enhance the overall storage capacity to be able to hold the bulk of the branches in programs with large working sets.

If a branch prediction entry associated with the initial IP address is found in the L1 BPT (called a "hit" in the L1 BPT), then the branch prediction information associated with the entry is used to predict a branch as being taken or not taken (i.e. to predict the subsequent IP address). If a branch prediction entry associated with the initial IP address is not found in the L1 BPT (called a "miss" in the L1 BPT), then the instruction associated with the IP address is decoded to determine if it is a branch instruction. If it is a branch instruction, then the branch prediction information from the L2 BPT is used to predict a branch as being taken or not taken.

For an alternate embodiment of the present invention, the software provides hints to the processor to aid in branch prediction. For this embodiment, these hints are used to determine whether to use the branch prediction information from the L2 BPT or branch prediction information encoded in the software itself to predict a branch as being taken or not taken.

A two level branch predictor design such as this may be found particularly useful for processors that are tasked with executing large applications, such as those that run on servers and workstations. A more detailed description of embodiments of the present invention, including various configurations and implementations, is provided below.

Figure 1:
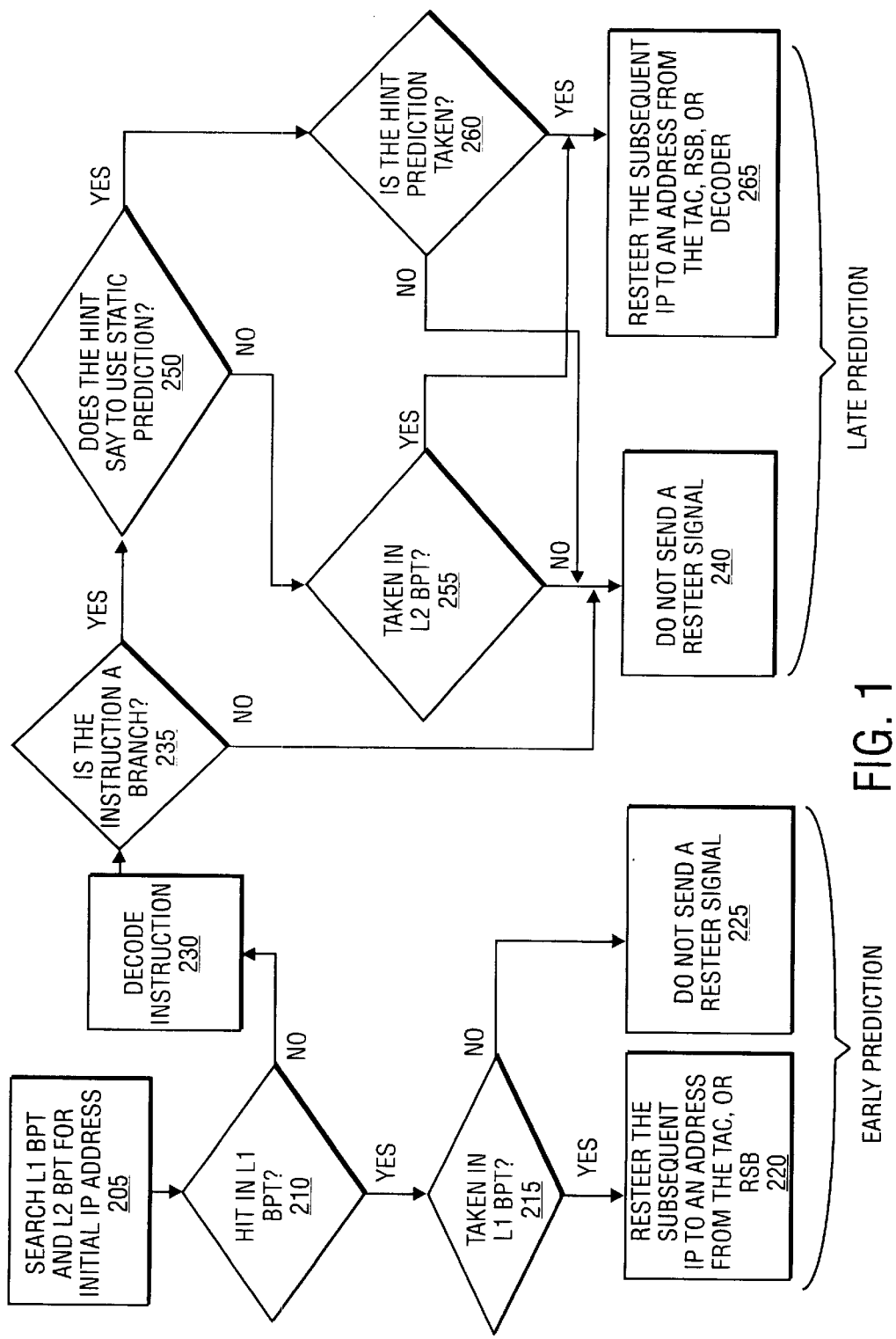
FIG. 1 is a flow chart showing a method of the present invention.

FIG. 1 is a flow chart showing a method of the present invention. At step 205, L1 and L2 branch prediction tables are searched for branch prediction entries associated with an initial IP address. The L1 BPT is a tagged, associative table and the L2 BPT is an untagged direct-mapped table. For one embodiment, the L1 BPT stores fewer branch prediction entries than the L2 BPT, but the L1 BPT is faster and provides for better branch prediction accuracy than the L2 BPT. Because the L1 BPT stores fewer branch prediction entries, the L1 BPT stores only those branch prediction entries that are most recently used and, therefore, most likely to be used again in the near future.

At step 210 of FIG. 1 it is determined whether or not there is a hit in the L1 BPT associated with the initial IP address. If there is a hit in the L1 BPT, it is next determined at step 215 whether or not the branch prediction information in the L1 BPT associated with the initial IP address indicates that the branch should be predicted as taken. If the branch is predicted to be taken, then at step 220 the subsequent IP address is resteered to an address from the TAC or RSB. If, instead, the branch is predicted to be not taken, then at step 225 no resteer signal is sent.

If there is no hit in the L1 BPT (a miss in the L1 BPT), a decoder decodes at least a portion of the instruction at step 230 of FIG. 1 to determine if the instruction associated with the initial IP address is a branch instruction. If the instruction is determined to be a branch instruction, a target address is also decoded by the decoder at step 230 as well as whether or not the instruction is a return. For an embodiment in which branch prediction hints are provided to the branch predictor by branch instructions, the decoder also decodes this hint information at step 230.

If it is determined at step 235 of FIG. 1 that the instruction is not a branch instruction, then at step 240 no resteer signal is sent. If the instruction is determined to be a branch instruction, then it is next determined at step 250 whether or not a hint associated with the branch instruction is static. Note that for an alternate embodiment of the present invention in which hints are not implemented, steps 250 and 260 are eliminated, and if the instruction is determined to be a branch, then the process flow skips from step 235 to step 255.

If the hint associated with the branch instruction is not static (i.e. it is dynamic), then it is next determined at step 255 of FIG. 1 whether or not the branch prediction information in the L2 BPT associated with the initial IP address indicates that the branch should be predicted as taken. If the branch is predicted to be taken, then at step 265 the subsequent IP address is resteered, predicting the subsequent IP to be an address from the TAC, the RSB (if the instruction is determined to be a return instruction), or an address decoded by the decoder. If, instead, the branch is predicted to be not taken, then at step 240 no resteer signal is sent.

If, instead, the hint associated with the branch instruction is static, then it is next determined at step 260 of FIG. 1 if the hint indicates whether the branch should be predicted as taken or not taken. If the branch is hinted to be taken, then the process flow proceeds to step 265 as described above. If, instead, the branch is hinted to be not taken, then the process flow proceeds to step 240 as described above.

Note that in accordance with an embodiment of the present invention, branch predictions made at steps 220 or 225 of FIG. 1 are completed earlier than branch predictions made at steps 240 or 265.

Figure 2:
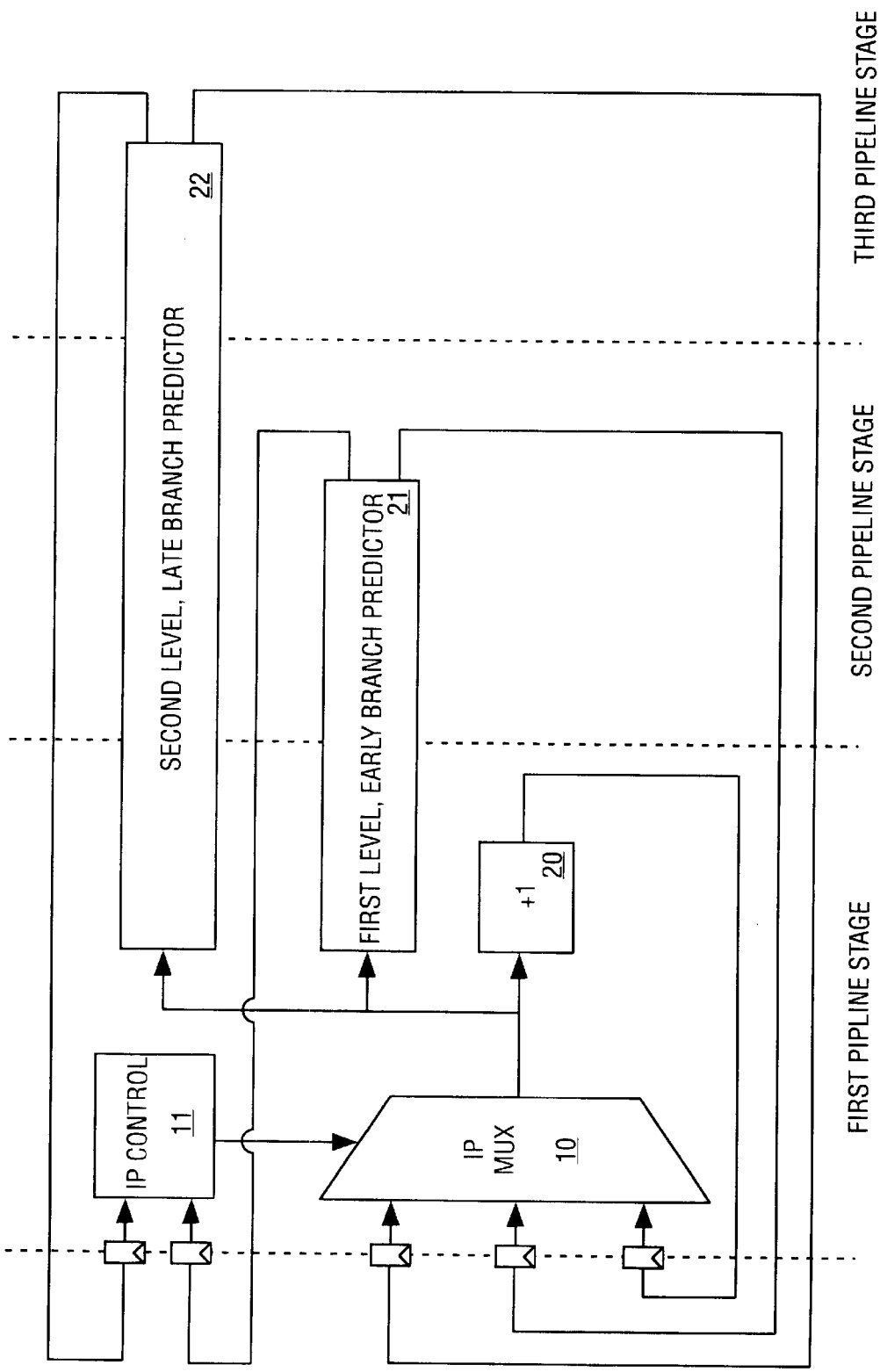
FIG. 2 shows a branch prediction pipeline in accordance with an embodiment of the present invention.

FIG. 2 shows a branch prediction pipeline in accordance with an embodiment of the present invention. According to the pipeline of FIG. 2, the output of IP multiplexer 10 provides an initial IP address to incrementer 20, first level (L1) branch predictor 21, and second level (L2) branch predictor 22. Incrementer 20 appropriately increments the initial IP address to create a subsequent IP address, and provides the subsequent IP address back to the input of IP multiplexer 10 during a first pipeline stage. IP incrementor 20 takes an initial IP address and increments it by a predetermined amount. The predetermined amount that is added to the initial IP address is the difference between 2 consecutive memory addresses that store consecutive instructions, or groups of instructions, of the program code being executed.

L1 branch predictor 21 may generate a resteer signal and provide this signal to an input to IP Control 11. This signal indicates whether or not the subsequent IP address is sequential to the initial IP address. If L1 branch predictor 21 sends a resteer signal to IP Control 11, this indicates that the subsequent IP is non-sequential, and L1 branch predictor 21 then provides a subsequent IP address to the input of IP multiplexer 10 during a second pipeline stage.

L2 branch predictor 22 may also generates a resteer signal and provide this signal to another input to IP Control 11. This signal similarly indicates whether or not the subsequent IP address is sequential to the initial IP address. If L2 branch predictor 22 sends a resteer signal to IP Control 11, this indicates that the subsequent IP is non-sequential, and L2 branch predictor 22 then provides a subsequent IP address to the input of IP multiplexer 10 during a third pipeline stage.

IP Control 11 then determines, based on the signals from L2 branch predictor 22 and L1 branch predictor 21, which of the three inputs to IP multiplexer 10 may be passed along to the output of the multiplexer. If neither L1 branch predictor 21 nor L2 branch predictor 22 sends a resteer signal, the incremented IP address from incrementer 20 is selected as the subsequent IP address output from multiplexer 10. If L1 branch predictor 21 sends a resteer signal, the IP address from the output of L1 branch predictor 21 is selected as the subsequent IP address output from multiplexer 10. If L2 branch predictor 21 sends a resteer signal, the IP address from the output of L2 branch predictor 21 is selected as the subsequent IP address output from multiplexer 10.

Note that as used herein, the term "initial IP address" refers to any IP address that is used as a reference point from which to predict a subsequent IP address. "Initial IP address" is not intended to be limited to the IP address associated with the first line of program code of a particular software application. An initial IP address may be any IP address associated with any line of program code of an application.

Figure 3:
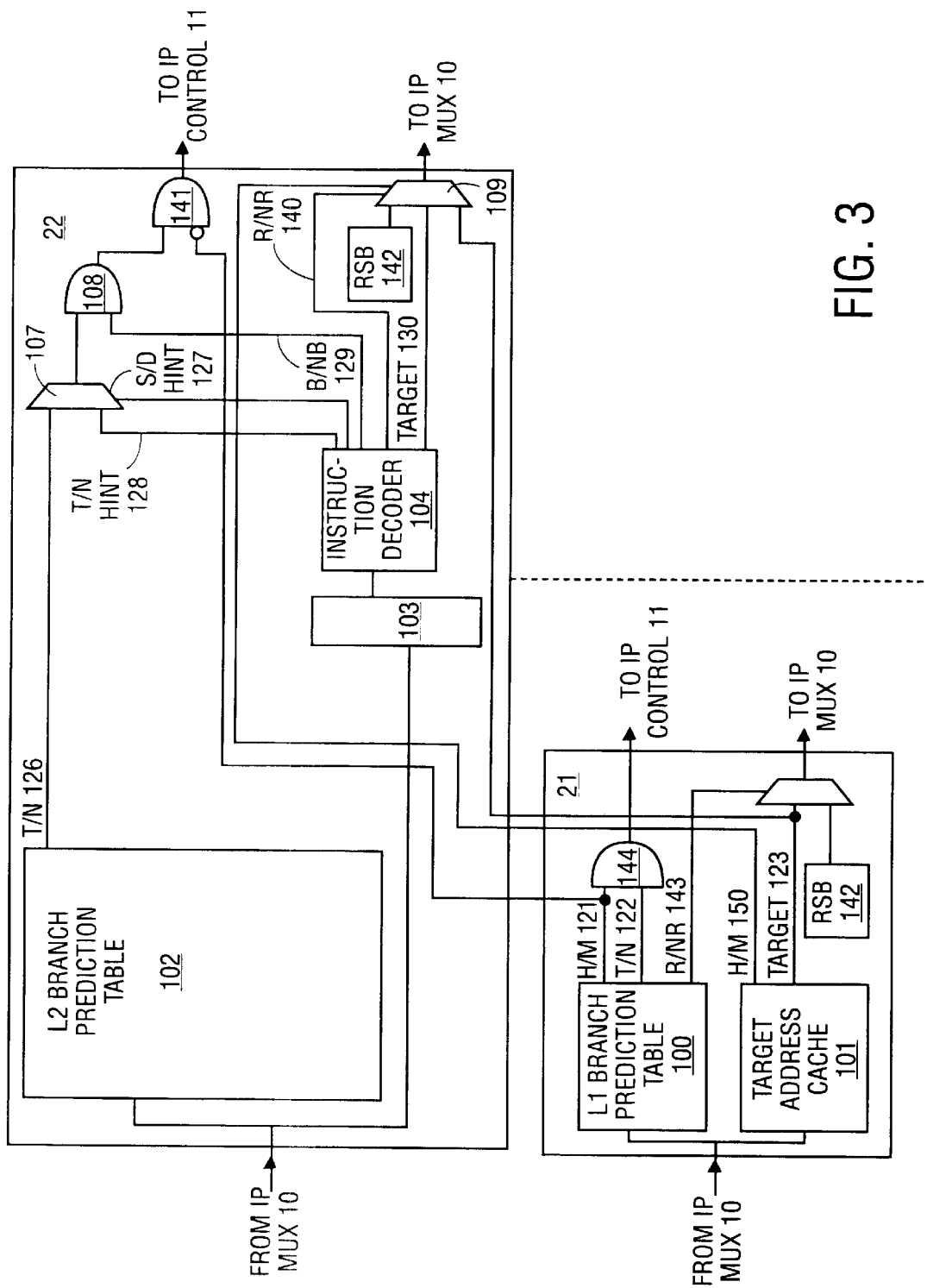
FIG. 3 shows the branch predictors of FIG. 2.

FIG. 3 shows L1 branch predictor 21 and L2 branch predictor 22 of FIG. 2 in accordance with an embodiment of the present invention. The branch predictor of FIG. 3 may be entirely contained on the same semiconductor substrate as the processor for which the branch predictor performs branch prediction. For another embodiment, one or more functional blocks of the branch predictor are located on a separate semiconductor substrate. For example, to reduce the overall size of the processor, L2 BPT 102 may be located on a separate semiconductor substrate.

L1 BPT 100 is an associative table that includes branch prediction entries referenced by address tags. Each address tag is associated with an IP address that contains a branch instruction. Each branch prediction entry in L1 BPT 100 includes, in addition to its associated address tag, branch prediction information. This branch prediction information is used by the branch predictor to predict whether or not the branch will be taken. The specific type of branch prediction information stored in L1 BPT 100 is commensurate with any of a variety of types of branch prediction algorithms that may be implemented by a branch predictor, many of which are well known to those skilled in the art.

For example, in accordance with one embodiment of the present invention, a local history prediction algorithm is implemented in conjunction with L1 BPT 100. For another embodiment, a global history branch prediction algorithm or a counter predictor (e.g. a 2 bit up-down counter, also known a bimodal branch predictor) is implemented in L1 BPT 100. For an alternate embodiment, L1 BPT 100 is divided into two or more separate branch prediction tables, each table implementing a different branch prediction algorithm. A selector circuit then determines which algorithm would provide the most accurate prediction for a particular instance and selects the appropriate table.

For one embodiment of the present invention, L1 BPT 100 of FIG. 3 is multi-way set associative. For another embodiment of the present invention, L1 BPT 100 is fully associative. To improve the speed with which branch prediction entries in L1 BPT 100 are searched, the table is kept relatively small, having a storage capacity of approximately 512 to 2K branch prediction entries.

The initial IP address to provided to the input to L1 branch predictor 21 of FIG. 3. This initial IP address is used to search L1 BPT 100 and the target address cache (TAC) 101. If the address is found in the L1 BPT, this is a hit, and a hit signal is sent along hit/miss signal line 121 to an input of AND gate 144. If the address is not found in L1 BPT 100, this is a miss, and a miss signal is sent along hit/miss signal line 121. If there is a hit in L1 BPT 100, and the associated entry in L1 BPT 100 indicates that the branch is taken, this is indicated by a taken signal sent along taken/not taken signal line 122 to the other input of AND gate 144. If there is a hit in L1 BPT 100, and the associated entry in L1 BPT 100 indicates that the branch is not taken, this is indicated by a not taken signal sent along taken/not taken signal line 122. If there is a hit that is taken in L1 BPT 100, and the L1 BPT further indicates that the branch is a return, this is indicated by a return signal set along return/not return signal line 143 to the control input of multiplexer 106. If there is a hit that is taken in L1 BPT 100, and the L1 BPT indicates that the branch is not a return, this is indicated by a not return signal set along return/not return signal line 143.

If there is a hit in L1 BPT 100 of FIG. 3, and the L1 BPT indicates that the branch is taken, AND gate 144 outputs a resteer signal to IP control 11. If there is either a miss in L1 BPT 100 or a not taken hit in the L1 BPT, AND gate 144 does not output a resteer signal. If AND gate 144 outputs a resteer signal, an IP address is also output from multiplexer 106. Return/not return signal line 143 determines the output of multiplexer 106. If signal line 143 indicates that the branch is a return instruction, the return address from return stack buffer (RSB) 142, which is coupled to an input to multiplexer 106, is propagated to the output of multiplexer 106 and, consequently, to IP multiplexer 10. If signal line 143 indicates that the branch is not a return instruction (for a taken hit in L1 BPT 100), the target address from TAC 101, which is coupled to the other input to multiplexer 106 via target bus 123, is propagated to the output of multiplexer 106 and, consequently, to IP multiplexer 10. In addition, a target address found in TAC 101, along with a hit miss signal, is also provided to an input to multiplexer 109 of L2 branch predictor 22, as described below.

L2 BPT 102 of FIG. 3 is a direct-mapped table that includes branch prediction entries containing branch prediction information without address tags. This branch prediction information is used by the branch predictor to predict whether or not a branch will be taken. The specific type of branch prediction information stored in L2 BPT 102 is commensurate with any of a variety of types of branch prediction algorithms that may be implemented by a branch predictor, many of which are well known to those skilled in the art. Some of these branch prediction algorithms are described above in conjunction with L1 BPT 100. L2 BPT 102 may implement any of these algorithms, or any combination of these algorithms, regardless of the type of algorithm implemented by L1 BPT 100.

It is advantageous, particularly from a cost perspective, for the branch prediction algorithm implemented in L2 BPT 102 of FIG. 3 to occupy a small amount of space. Therefore, in accordance with one embodiment of the present invention, L2 BPT 102 implements a two bit counter algorithm as its method of branch prediction. Although a two bit counter algorithm may not be as accurate as, for example, the local or global branch prediction algorithm implemented in L1 BPT 100, a branch prediction table that uses a two bit counter algorithm requires only two bits of storage per branch prediction entry. Branch prediction tables that implement either local or global branch prediction algorithms can require well over two bits of storage per branch prediction entry. By using untagged branch prediction entries and a two bit counter algorithm, L2 BPT 102 can store anywhere from four to eight or more times as many branch prediction entries as L1 BPT 100 in approximately the same amount of space. Thus, for one embodiment of the present invention, L2 BPT 102 has a relatively large storage capacity of approximately 2K to 8K or more branch prediction entries. For one embodiment in which the L2 BPT is untagged, a branch that does not have an associated static hint (described in more detail below) may update the L2 BPT prediction upon retirement.

The branch prediction information stored in the branch prediction entry associated with the initial IP address is read from L2 BPT 102 of FIG. 3, and a taken or not taken branch prediction is calculated using this information. Depending on the branch prediction, a taken or not taken signal is sent out along t/n line 126 to an input of multiplexer 107. For an embodiment of the present invention in which L2 BPT 102 is direct-mapped, there is always be a hit in this table. This means that some percentage of these hits may associate one IP address with branch prediction information of a different IP address. One way to avoid this problem is to store address tags in L2 BPT 102, and compare those tags to the tags of incoming IP addresses. The cost benefit of reduced table size by not storing tags in L2 BPT 102, however, may be found to be more valuable than the increased branch prediction accuracy gained by storing tags.

Input instruction buffer 103 is searched using the initial IP address from IP multiplexer 10 of FIG. 3, and the associated instruction is provided to instruction decoder 104. For one embodiment of the present invention, decoder 104 partially or fully decodes the instruction to determine whether or not the instruction is a branch instruction, and, if so, the decoder additionally determines the target address and whether or not the instruction is a return. Depending on whether or not the instruction is a branch (or return), an appropriate signal is sent to the input of AND gate 108 via b/nb line 129. Target address 130 is sent from decoder 104 to an input of multiplexer 109.

For an embodiment in which branch prediction hints are included in the instruction, decoder 104 of FIG. 3 also determines if the branch prediction hint is static or dynamic, and, if static, the decoder determines if the hint is taken or not taken. A signal indicating a hint as being static or dynamic is provided to the control input of multiplexer 107 via s/d hint line 127. A signal indicating a hint as being taken or not taken is provided to an input of multiplexer 107 via t/n hint line 128. A static hint indicates to the branch predictor that the associated branch instruction should always be predicted as taken or not taken (depending on the taken/not taken hint value) regardless of any branch prediction information found in L2 BPT 102. A dynamic hint indicates to the branch predictor that the branch prediction information found in L2 BPT 102 should be used to predict the branch as taken or not taken. For an alternate embodiment of the present invention, an instruction that includes a dynamic hint also includes a taken/not taken hint that is used as the branch prediction upon initial execution of the branch instruction. Thereafter, branch prediction information stored in a branch prediction table is used to determine subsequent branch predictions for this branch instruction.

If the signal provided to the control input of multiplexer 107 of FIG. 3 via s/d hint line 127 indicates that the hint is dynamic, then the multiplexer selects, as its output, the taken/not taken signal from L2 BPT 102 across t/n line 126. If the signal provided to the control input of multiplexer 107 instead indicates that the hint is static, then the multiplexer selects, as its output, the taken/not taken hint signal from decoder 104 across t/n hint line 128. For one embodiment in which the L2 BPT is tagged, the hint is dynamic, and there is a miss in the L2 BPT, the decoded prediction is still used. For this embodiment, a hit/miss line (or the inverse thereof from L2 BPT 102 may be ANDed (or NANDed) with s/d hint line 127 (or the inverse thereof), with the output being coupled to the control input of multiplexer 107.

If the signal provided to the input of AND gate 108 via b/nb line 129 of FIG. 3 indicates that the instruction associated with the IP address is a branch (or return) instruction, and the output of multiplexer 107 indicates that the branch is taken, then AND gate 108 outputs a resteer signal to an input of AND gate 141. Otherwise, AND gate 108 does not output a resteer signal. The other input of AND gate 141 is an inverting input coupled to hit/miss signal line 121 from L1 BPT 100. AND gate 141 functions to prevent a resteer signal from being sent to IP Control 11 if the output of AND gate 108 indicates a resteer, but there is a hit in the L1 BPT. This is done because an early prediction from L1 BPT 100 may be found to be more accurate than the late prediction from L2 BPT 102. Hence, AND gate 141 outputs a resteer signal to IP Control 11 when the output of AND gate 108 indicates resteer and there is a miss in L1 BPT 100.

Multiplexer 109 of FIG. 3 is controlled by a return/no return signal from instruction decoder 104 via r/nr signal line 140, and by a TAC 101 hit/miss signal via h/m signal line 150. Instruction decoder 104 selects the appropriate output for multiplexer 109. For example, If n/nr signal line 140 indicates that the instruction is a return instruction, the return address from return stack buffer (RSB) 142 (the same RSB output provided to L1 branch predictor 21), which is coupled to an input to multiplexer 109, is propagated to the output of multiplexer 109 and, consequently, to IP multiplexer 10. If signal line 140 indicates that the branch is not a return instruction (for a taken branch), the target address from TAC 101 is propagated to the output of multiplexer 109 if there is a hit in TAC 101 as indicated by h/m signal line 150. Otherwise, the target address decoded by decoder 104 and provided to another input to multiplexer 109 via target bus 130 is propagated to the output of multiplexer 109.

The subsequent IP prediction is then provided to the processor, and the instructions located at that address are executed by the processor. This prediction is later determined to be either correct or incorrect. The branch prediction information stored in the L1 BPT 100 and in the L2 BPT 102 associated with the predicted branch instruction may then be updated to improve the prediction accuracy the next time the branch instruction is executed. For one embodiment of the present invention, if the IP address associated with a branch instruction missed in the L1 BPT, and the branch instruction does not provide a static hint, the L1 BPT is updated to include a branch prediction entry associated with the IP address.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
    a first branch prediction table (BPT), coupled to an instruction pointer (IP) generator, to store a first plurality of branch prediction entries; and
    a second BPT, coupled to the IP generator, to store a second plurality of branch prediction entries to predict both taken and not taken branches, wherein the processor does not include storage space for target address information associated with the second plurality of branch prediction entries.

2. The processor of claim 1, the first BPT to store tagged branch prediction entries and the second BPT to store untagged branch prediction entries.

3. The processor of claim 1, further comprising a circuit coupled to the first BPT to predict a subsequent IP address as being a target address stored in a target address cache if the first BPT indicates that a branch is taken.

4. The processor of claim 1, further comprising a circuit coupled to the second BPT to predict a subsequent IP address as being a target address stored in a return stack buffer if the second BPT indicates that a branch is taken.

5. The processor of claim 1, wherein the second BPT is sized to store two or more times the number of branch prediction entries as the first BPT.

6. The processor of claim 1, wherein the first BPT is to implement a first type of prediction algorithm and the second BPT is to implement a second type of prediction algorithm that is different from the first type of prediction algorithm.

7. A processor comprising:
    an instruction pointer (IP) generator;
    a first level branch prediction table (BPT), coupled to the IP generator, the first level BPT having stored therein a first plurality of branch prediction entries associated with a first plurality of addresses;
    a second level BPT, coupled to the IP generator, the second level BPT having stored therein a second plurality of branch prediction entries associated with a second plurality of addresses, wherein the second level BPT does not store target address information, and the second plurality of branch prediction entries are to predict both taken and not taken branches; and
    a decoder to determine the target address information.

8. The processor of claim 7, further comprising a target address cache coupled to the IP generator and having stored therein a plurality of target addresses associated with the first plurality of addresses.

9. The processor of claim 8, if further comprising a circuit to select, as its output, a target address from the target address cache if there is a hit in the first level BPT indicating that a branch is taken.

10. The processor of claim 7, further comprising groups of instructions in a memory location coupled to the IP generator and having stored therein a plurality of branch hints.

11. The processor of claim 10, further comprising a circuit to select, as its output, a target address from the memory location if a hit in the second level BPT indicates that a branch is taken and an associated hint in the memory location is dynamic.

12. The processor of claim 7, wherein there are between two to four times as many addresses in the second plurality of addresses as there are in the first plurality of addresses, and the second plurality of addresses includes the first plurality of addresses.

13. A computer system comprising:
    program code including first and second branches that may be taken or not taken; and
    a processor including:
        a first branch predictor to store a first branch prediction entry and a first target address, both associated with the first branch;
        a second branch predictor to store a second branch prediction entry and to exclude a second target address, both associated with the second branch; and
        an instruction decoder to determine the second target address.

14. The system of claim 13, wherein the first branch predictor comprises a first branch prediction table to store the first branch prediction entry and the first target address.

15. The system of claim 14, wherein the second branch predictor comprises a second branch prediction table to store the second branch prediction entry and to exclude the second target address.

16. The system of claim 13, wherein the processor further comprises a target address cache to store the first target address.

17. The system of claim 16, wherein the target address cache is to exclude the second target address.

18. The system of claim 13, wherein the second branch predictor is to store two or more times the number of branch prediction entries as the first branch predictor.

19. The system of claim 13, wherein the first branch predictor is to implement a first type of prediction algorithm and the second branch predictor is to implement a second type of prediction algorithm that is different from the first type of prediction algorithm.

20. A processor comprising:
- a first branch predictor to store a first branch prediction entry and a first target address, both associated with a first branch that may be taken or not taken;
- a second branch predictor to store a second branch prediction entry and to exclude a second target address, both associated with a second branch that may be taken or not taken; and
- an instruction decoder to determine the second target address.

21. The processor of claim 20, wherein the processor further comprises a target address cache to store the first target address and to exclude the second target address.

22. The processor of claim 21, wherein the first and second branches are the same.

23. The processor of claim 20, wherein the second branch is the first branch.

24. The processor of claim 20, wherein the second branch predictor is to store two or more times the number of branch prediction entries as the first branch predictor.

25. The system of claim 20, wherein the first branch predictor is to implement a first type of prediction algorithm and the second branch predictor is to implement a second type of prediction algorithm that is different from the first type of prediction algorithm.

* * * * *